United States Patent Office 3,308,370
Patented Mar. 7, 1967

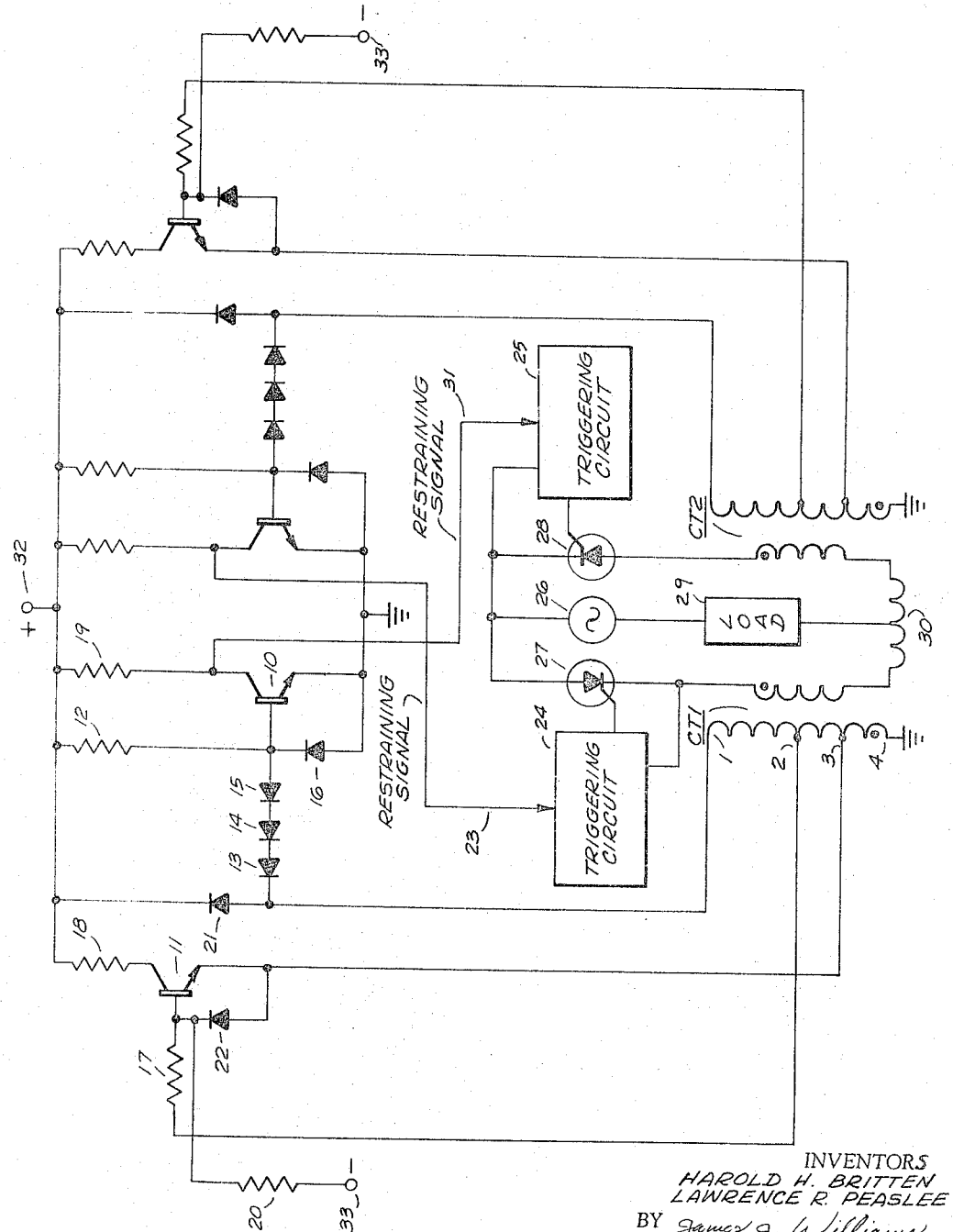

3,308,370
CURRENT SENSING AND CONTROL CIRCUIT
Harold H. Britten, incompetent, Waynesboro, Va., by J. B. Stombock, committee, Waynesboro, Va., and Lawrence R. Peaslee, Waynesboro, Va., assignors to General Electric Company, a corporation of New York
Filed Apr. 5, 1963, Ser. No. 271,839
6 Claims. (Cl. 321—45)

This invention relates to control circuits, and more particularly, it relates to control circuits operative to generate a discrete signal indication in response to predetermined conditions.

The apparently simple function of recognizing the instant of time at which current in a circuit begins to flow or ceases to flow, attains a considerable degree of importance in connection with the control over certain types of electrical components. For example, in power generating equipment wherein a pair of oppositely oriented controlled rectifiers is used for controlling the amount of power delivered to a load over a complete cycle of alternating power, the efficiency of the equipment and its ability to deliver undistorted power is greatly affected by the precise switching of the controlled rectifiers. If the rectifiers associated with the opposing current polarities are simultaneously conductive, or if there are time delays between the conductive periods of the rectifiers associated with the opposing current polarities, the output waveform may be severely distorted. Periods during which there is no power delivery are also periods during which the system is not operating at full efficiency. In view of these effects of improper timing with respect to controlled rectifier switching, it is of prime importance to insure that they are neither simultaneously conducting nor inactive during periods when conduction could take place effectively.

The prime factor in determining the appropriateness of triggering in circuits of this type is recognition of the instant of time at which the current flowing through particular controlled rectifiers commences or ceases. In systems where relatively high frequency alternating current power is being handled, several microseconds of indecision is effective to damage both the efficiency of the system and the waveform quality of the power delivered.

An object of the present invention is to provide an improved high sensitivity current detection circuit operative to produce a discrete signal in response to a predetermined current condition.

Another object of the invention is to provide means operative in conjunction with a full-wave controlled rectifiers circuit for providing a restraining signal to the respective triggering circuits of the controlled rectifiers when current is flowing through the opposing controlled rectifier of each pair.

In accordance with an illustrative embodiment of the invention, a pair of oppositely polarized controlled rectifiers is connected between an alternating current source and a load. The triggering circuits for these individual controlled rectifiers are supplied by a restraining signal whenever current is flowing in the other rectifier of the pair. This restraining signal is generated in a unique control circuit that is coupled to the output of the respective controlled rectifiers by means of a multiple-tapped current transformer.

The novel features of the invention are set forth with particularity in the appended claims. The invention itself, however, both as to its organization and method of operation together with further objects and advantages thereof may best be understood by reference to the following description taken in conjunction with the accompanying drawing which comprises a circuit schematic of an illustrative embodiment of the invention.

The function of the current sensing circuitry illustrated in the drawing is to generate a signal when current is flowing through the associated controlled rectifier. In general, the controlled rectifiers associated with each polarity of applied power have an independent current sensing circuit. The signals generated are applied to inhibit or restrain the triggering circuit of the controlled rectifier associated with the opposite polarity of the applied alternating current. A circuit for performing current sensing in a three-phase frequency converter appears in FIGURE 15 of the co-pending patent application of L. R. Peaslee, Serial No. 129,646, filed August 7, 1967, issued October 6, 1964, as U.S. Patent 3,152,297 now reissue application Serial No. 559,031, and assigned to the General Electric Company, assignee of the present invention.

The illustrative embodiment described hereinafter relates to a current sensing and control circuit that is an improvement over the current sensing circuit shown in the above cited patent application. While this illustrative embodiment is shown in a single phase system, it is equally applicable to poly-phase arrangements. It should be understood that circuitry of the nature shown herein may well be employed in variable speed constant frequency systems such as that illustrated in the cited patent application.

In the lower central portion of the figure, a load 29 is illustrated as being supplied by an alternating current source 26. One terminal of the alternating current source is connected directly to load 29 and the other terminal is connected via oppositely oriented controlled rectifiers 27 and 28 to the other side of load 29 by means of the primary windings of current transformers CT1 and CT2 and the left and right halves of a center-tapped inductance 30, respectively. Current transformers CT1 and CT2 are developed upon square loop cores in order to facilitate the rapid switching conditions which are essential for providing the extreme sensitivity of the instant circuitry.

Actually, the drawing shows identical circuits for generating restraining signals for application to the respective triggering circuits 24 and 25 of controlled rectifiers 27 and 28. It will be sufficient to a clear understanding of the invention to describe the operation of the circuit associated with the output of controlled rectifier 27 only. The function of this circuitry is to detect current flow in the output of controlled rectifier 27 in order to generate a restraining signal on lead 31 which will prevent triggering of controlled rectifier 28 while current is flowing through controlled rectifier 27.

The lefthand current sensing circuit comprises a normally conducting transistor 10 and a normally nonconducting transistor 11. Transistor 10 is maintained in a fully saturated state by means of connections comprising a resistor 12 between its base and a positive potential source 32, a resistor 19 between its collector and the positive potential source 32, and a direct connection between its emitter and ground. Transistor 11 is maintained nonconducting by a negative potential source 33 connected by resistor 20 to the base thereof while the collector is connected by a resistor 18 to positive potential 32 and the emitter is connected via a portion (tap 3 to tap 4) of the secondary winding of transformer CT1 to ground. The secondary of current transformer CT1 is connected to both transistors 10 and 11 in such a fashion that when current is flowing through controlled rectifier 27, a voltage is induced in the secondary windings of transformer CT1 which is operative to render transistor 10 nonconductive. Subsequently, when the current ceases, the collapsing flux in the secondary winding of transformer CT1 is effective to render transistor 11 conductive, and, due to the unique interconnections, to in fact "snap" it into a full conducting state with extreme rapidity. The conventional dot notation is used in the figure to indicate the relationship between the primary and secondary windings.

Considering circuit operation, it will be noted that when current is flowing through controlled rectifier 27, a voltage is induced in the secondary winding of transformer CT1 which is negative at terminal 1 with respect to terminal 4. The effect of this negative voltage is to establish a low impedance path from the base of transistor 10 to the secondary winding of transformer CT1 and thence to ground, including the serially connected rectifiers 13, 14, and 15. This low impedance path diverts the saturation current normally flowing through resistor 12 into the base of transistor 10 and reduces the voltage appearing thereat until eventually rectifier 16 is rendered conductive. Obviously, at this time, a voltage equivalent to the voltage drop across rectifier 16 reverse-biases transistor 10 and renders it nonconductive. It should be noted that the secondary of transformer CT1 acts as a constant current source until the voltage across the secondary increases to the instant at which diode 16 conducts and the voltage is thereafter limited to that of the voltage drop of the four series diodes 13, 14, 15, and 16. Transistor 10 remains nonconductive and therefore supplies a positive signal to lead 31, until the current in the secondary of transformer CT1 drops below a threshold value at which enough current from positive potential 32 through resistor 12 is supplied into the base of transistor 10 to turn it again to the saturated conducting state. The threshold value is controlled by appropriate biasing in accordance with what current level may be tolerated when the opposing controlled rectifier, i.e. 28, is fired. The square loop core of transformer CT1 is designed to avoid saturation with the highest current pulse that it may receive in conjunction with the particular circuit parameters.

At the instant current ceases to flow through controlled rectifier 27, the flux in the core of transformer CT1 collapses to a residual value and produces a reverse voltage on the secondary thereof. Accordingly, terminal 2 becomes positive with respect to terminal 3 and current is supplied via resistor 17 to the base of transistor 11. In response to this current supply, transistor 11 begins conduction and additional current flows from positive voltage source 32 to ground, in the path including resistor 18, the collector to emitter path of transistor 11 and terminal 3 of the secondary of transformer CT1. This additional current supplies direct energization to the secondary winding which is effective by autotransformer action to increase the voltage level of terminal 2 with respect to terminal 3. In turn, this causes more current to be supplied to the base of transistor 11 and it is rendered more conductive. The positive feedback loop thus created causes transistor 11 to quickly snap into a full conducting state.

When transistor 11 is fully conducting, the low collector-emitter impedance permits substantially complete application of voltage 32 across terminals 3 and 4 of the secondary winding. The transformer core is accordingly reset. The forced resetting drives the flux down the hysteresis loop very quickly and also quickly shuts off the reset current as soon as a sudden reduction in voltage indicates that the core has been set. Once reset, transformer CT1 and the entire circuit is ready for appropriate operation the next time a positive pulse of current passes through the primary thereof.

From the standpoint of the triggering circuit 25 which controls operation of controlled rectifier 28, a positive restraining voltage is applied on lead 31 when current is flowing through the opposite controlled rectifier 27. The particular triggering circuit employed and the manner in which it responds to this restraining signal is not germane to the invention. By way of example, however, reference may be made to the above-cited patent application, Serial No. 129,646, wherein restraining signals are applied to a triggering circuit. Specifically, in FIGURE 13 of this patent application, a restraining signal is applied via resistor 362 to a base electrode 352 of a transistor 350.

Operation in response to a half cycle of alternating current has been described. It will be understood that during the succeeding half cycle the circuitry on the right side of the drawing operates in a manner similar to that described to provide a restraining signal on conductor 23 for the triggering circuit 24 of controlled rectifier 27. In the absence of transistor 11, which provides the forced reset of the transformer CT1, the sensitivity of the circuit would be considerably less inasmuch as it would be necessary to overcome the effects of the reset current before transistor 10 could be switched to the conducting state. For example, if a fixed resistor were used in place of transistor 11, the flux would reside at such a level that small transients of current would be capable of producing spurious output signals. It should be recognized that the means embodied in transistor 11 is of fundamental importance to the extreme sensitivity of the circuit.

It will be understood that although the invention has been described in connection with current sensing at the output of a controlled rectifier for purposes of developing a restraining signal on cooperating controlled rectifiers, it may also be used in any other applications wherein extreme sensitivity of a current sensing device is required. The specific embodiment shown should not be construed as limiting the scope of the invention since many modifications may be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. A circuit for sensing the flow of current in a line comprising, a current transformer having a core exhibiting a substantially rectangular hysteresis characteristic and a primary and secondary winding, means coupling the primary winding of said transformer to said line, signal generating means connected to the secondary winding of said transformer and operative to generate a voltage output indicating current flow in said line in response to a voltage of a first polarity being induced in said secondary winding by at least a predetermined minimum current flow in said line, a source of potential, and a controlled current conducting device interconnected between said source of potential and said secondary winding and operative to conduct in response to a voltage of a second polarity induced in said secondary winding when the current in said line is less than said predetermined minimum or of an opposite sense, the current through said device, when conducting being supplied to said secondary to increase the voltage being generated therein and to reset said core.

2. A circuit for sensing the flow of current in a line comprising, a current transformer coupled to said line, a normally conducting switching device, means interconnecting the secondary of said transformer and said normally conducting switching device for rendering it nonconductive when at least a predetermined minimum forward voltage is induced in said secondary by current in said line so that an output voltage is generated by said switching device to indicate current flow in said line, a normally nonconducting switching devices, and means interconnecting the secondary of said transformer and said normally nonconducting switching device for rendering it conductive in response to the reverse voltage generated in said secondary upon cessation of current in said line, said normally nonconducting switching device being further connected to supply current to said secondary for enhancing said reverse voltage generation during its conducting interval.

3. A circuit for sensing the flow of current in a line comprising, a current transformer having a core exhibiting a substantially rectangular hysteresis characteristic, means coupling said transformer to said line, a normally conducting transistor, means connecting said normally conducting transistor to the secondary of said transformer and operative to render it nonconductive to produce an output voltage indicative of current flow in said line when at least a predetermined minimum voltage of a first polarity is induced in said secondary due to current of a first polarity in said line, a normally nonconducting transistor, means connecting said normally nonconducting transistor to said secondary and operative to render it conductive in response to the voltage of a second polarity induced in said secondary upon cessation or polarity reversal of current in said line, and means coupled to said normally nonconducting transistor and said transformer for enhancing the generation of voltage of said second polarity by said secondary by supplying current thereto upon conduction of said normally nonconducting transistor.

4. A circuit for sensing the flow of current in a line comprising a current transformer having a core with a substantially reactangular hystersis loop, means coupling said transformer to said line, a first switching device, bias means biasing said first switching device into conduction, means coupling said first switching device to said transformer and operative to overcome said bias and turn off said switching device so that an output signal indicative of current flow in said line is produced by said first switching device when a voltage of a first polarity above a predetermined minimum is induced in said transformer, a second switching device, bias means biasing said second switching device to prevent conduction thereof, means coupling said second switching device to said transformer so that when the current flow in said line falls below said predetermined minimum and a voltage of the opposite polarity is induced in said transformer the bias applied to said second switching device is overcome and said second switching device is caused to conduct, and feedback means coupling the output of said second switching device to said transformer to enhance the induced voltage of said second polarity to reset the core of said transformer.

5. A circuit for controlling a pair of oppositely oriented controlled rectifiers comprising, a current transformer having a core with a substantially rectangular hysteresis loop coupled to the output of one of said controlled rectifiers, signal generating means connected to the secondary of said transformer and operative to generate a signal when at least a predetermined minimum current is supplied at the output of said one controlled rectifier, triggering means normally adapted to initiate conduction in the other of said controlled rectifiers and inhibited during the persence of said signal, a source of potential, and a controlled current conducting device interconnected between said source of potential and said secondary and operative to conduct in response to the voltage induced in said secondary when the current supplied at the output of said controlled rectifier is less than said predetermined minimum, the current through said device, when conducting, being supplied to said secondary to increase the voltage being generated therein and to reset said core.

6. A circuit for controlling a pair of oppositely oriented controlled rectifiers comprising, a current transformer having a core with a substantially rectangular hysteresis loop coupled to the output of one of said controlled rectifiers, a first and a second transistor, means for forward-biasing said first transistor, means interconnecting the secondary of said transformer to said first transistor and operative to overcome said forward-bias when at least a predetermined minimum voltage is induced in said secondary, triggering means normally adapted to initiate conduction in the other of said controlled rectifiers and inhibited during nonconduction of said first transistor, means for reverse-biasing said second transistor, and means interconnecting the secondary of said transformer to said second transistor and operative to overcome said reverse-bias when less than said predetermined minimum voltage is induced in said secondary, the current through said second transistor, when conducting, being supplied to said secondary to increase the voltage being generated therein and to reset said core.

References Cited by the Examiner
UNITED STATES PATENTS

| 2,151,753 | 3/1939 | Etzrodt | 328—81 |
| 3,192,464 | 6/1965 | Johnson et al. | 321—18 |
| 3,201,593 | 8/1965 | Anderson et al. | 307—88.5 |

JOHN F. COUCH, *Primary Examiner.*

WM. SHOOP, *Assistant Examiner.*